Nov. 5, 1968    G. W. WOLFE    3,408,670
SWIMMING DEVICES
Filed Aug. 17, 1967    5 Sheets-Sheet 1
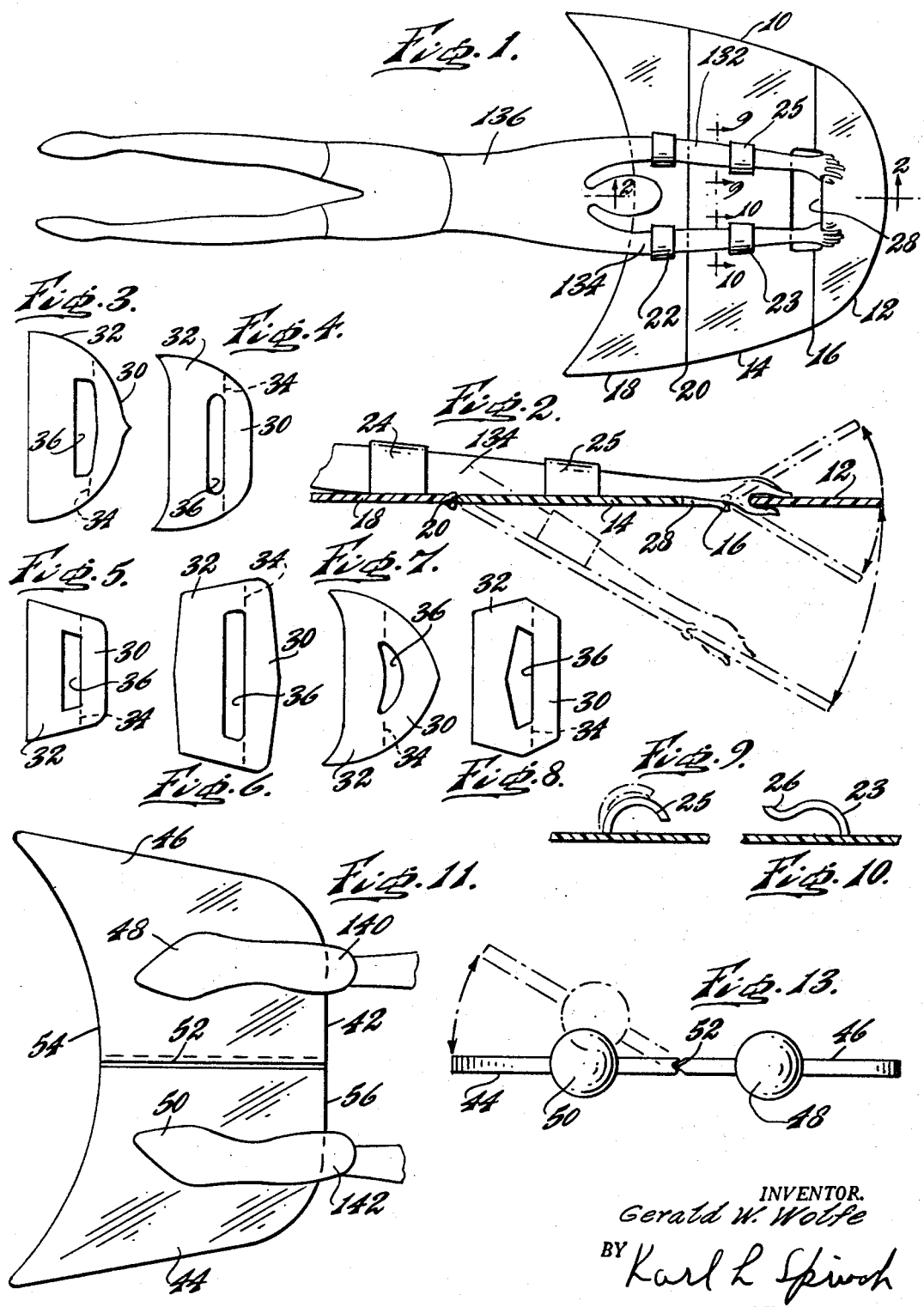
INVENTOR.
Gerald W. Wolfe
BY Karl L. Spivok
ATTORNEY Nov. 5, 1968    G. W. WOLFE    3,408,670
SWIMMING DEVICES
Filed Aug. 17, 1967    5 Sheets-Sheet 2

INVENTOR.
Gerald W. Wolfe
BY Karl L. Spivak
ATTORNEY

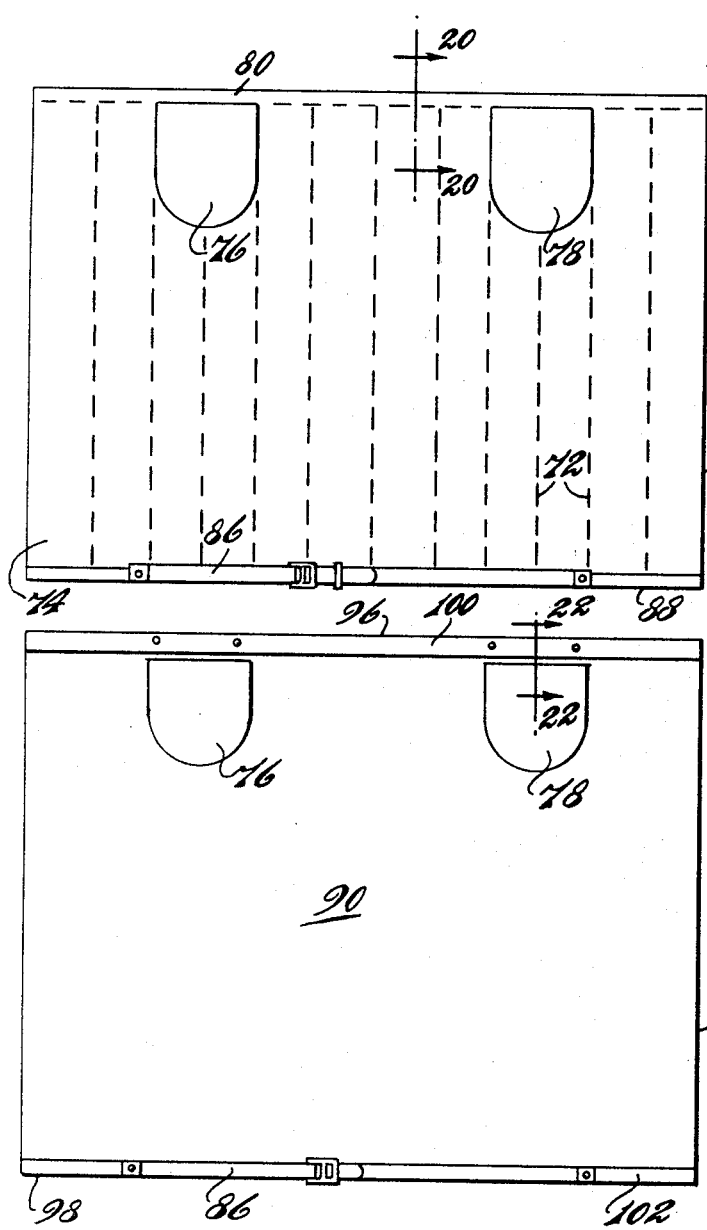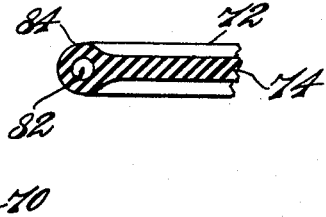

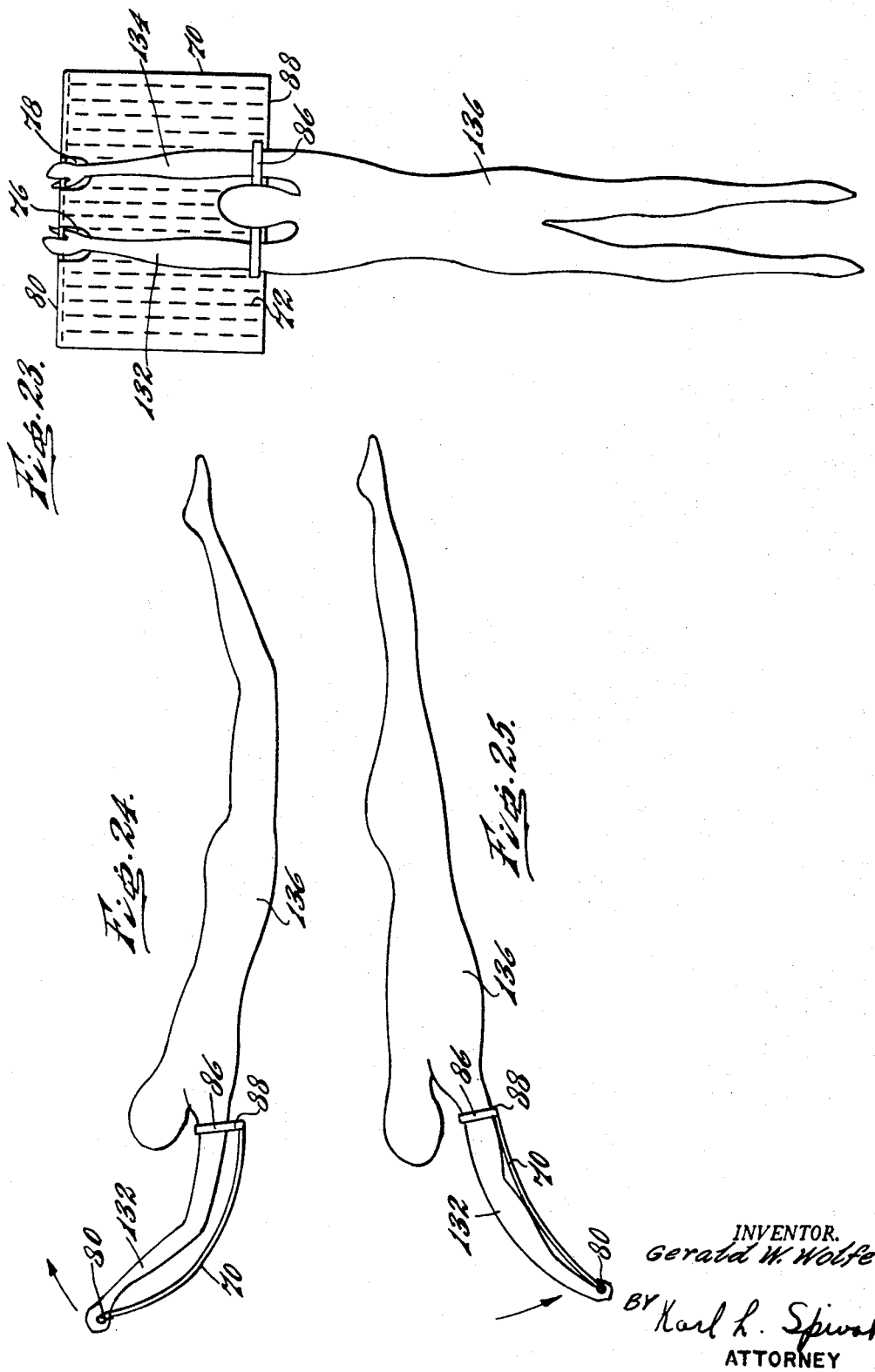

Nov. 5, 1968 G. W. WOLFE 3,408,670
SWIMMING DEVICES
Filed Aug. 17, 1967 5 Sheets-Sheet 5
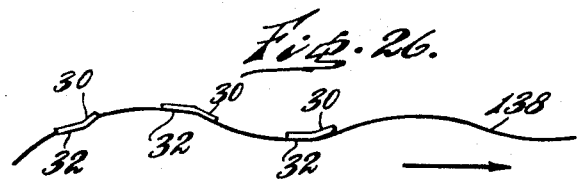
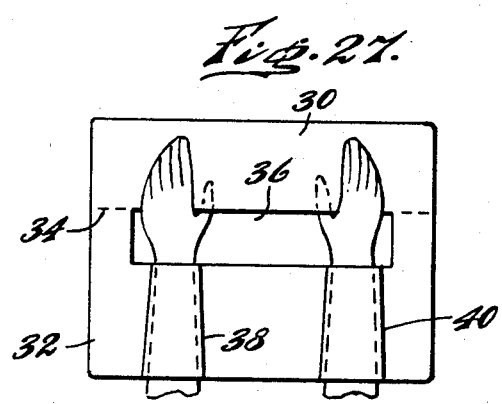
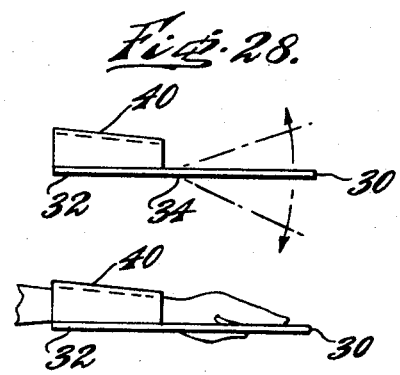
INVENTOR.
Gerald W. Wolfe
BY
Karl L. Spivak
ATTORNEY _United States Patent Office_

3,408,670
Patented Nov. 5, 1968

3,408,670
SWIMMING DEVICES
Gerald W. Wolfe, Woodhaven and Pinewood Roads,
Philadelphia, Pa. 19116
Filed Aug. 17, 1967, Ser. No. 661,769
3 Claims. (Cl. 9—307)

ABSTRACT OF THE DISCLOSURE

A swimming device comprising a unitary, thin, flat sheet of flexible material incorporating stiffening means along the forward and trailing edges thereof, and incorporating arm and hand engaging means whereby the device may be repetitively flexed to aid a swimmer in propelling himself through the water.

---

Swimming devices including relatively thin flat planes attached to the hands and feet of a swimmer to aid in propelling the swimmer through the water.

This invention relates to the general field of aquatics, and is more particularly directed to a plurality of swimming aids and to a unique method of using these devices, the total result being to introduce and teach an entirely new procedure for propelling the human body through the water.

Prior art swimming devices such as fins for the feet, fins for the hands and boards of varying designs are all well-known and in popular use throughout this and other countries. The swimming aids as herein presently contemplated, all are directed to increasing the surface of contact between the swimmer and the water, and thus increase the rate of propulsion therethrough. Novel arm and hand swimming accessories in various configurations and sizes, all as hereinafter more fully set forth, furnish a greatly increased area of contact to be controlled by the arms of the swimmer than has ever before been considered possible. Further, the arms of the swimmer work together in unison to guide the novel swimming planes set forth in the drawings rather than independently and alternately as is now required with the presently known devices.

Similarly, swim flippers or fins have been designed to provide a large water contact area to be controlled by the feet of the swimmer. The fins are generally rectangular and flat in configuration, and the lineal peripheral contours may be varied in accordance with the skill, strength and desires of the swimmer. Novel interlocking features have been incorporated to permit the fins to be used either singly as in present practice, or preferably as a unit with both feet working in unison to propel the swimmer through the water.

It is contemplated that by using the novel swimming planes affixed to the arms and the flipper attached to the feet and interlocked, the swimmer will be able to operate his arms in unison and his legs in unison in a new swimming motion and method. By grasping the blade of the swimming plane and flexing it upwardly and downwardly with the hands and simultaneously coordinating the actions of the hands with upward and downward movements of the arms, a rhythmic, paddle-like motion can be set up. Upon proper manipulation of the swimming planes by the hands and the arms, a hydrodynamic current action of the water may be established that is quite similar to the action of the flippers on a fish. The leg and foot operated fins can be utilized to amplify and augment the currents and movements of the arms by coordinating the leg strokes in a manner to give the optimum propulsion through the water. It is contemplated that the leg strokes and coordination presently used by expert swimmers when swimming the "butterfly" type of breast-stroke will be satisfactory for the present swimming method.

It is thus seen that an apparatus and method has been devised to enable a swimmer to guide his body upwardly and downwardly through the water by utilizing extended surface swimming planes and fins. By alternating upward and downward movements of the arms and coordinating the directing movements of the hands and the power strokes of the legs, the swimmer may guide his progress and propel himself through the water near the surface thereof in much the same manner as a porpoise.

It is therefore an object of this invention to provide improved swimming planes and fins of the type set forth.

It is another object of this invention to provide novel swimming planes and fins of configuration permitting large surface to water contact areas.

It is another object of this invention to provide novel swimming planes and fins designed to permit porpoise-like propulsion through the water.

It is another object of this invention to provide novel arm operated planes and leg operated fins to provide uniform simultaneous movements of the arms and of the legs.

It is another object of this invention to provide novel swimming planes and fins incorporating readily disengageable sections to facilitate alternating movements of the arms and of the legs.

It is another object of this invention to provide novel swimming planes and fins including body member engaging facilities adapted for easy grasping and ready disengagement in case of emergency.

It is another object of this invention to provide novel swimming planes and fins that are rugged in construction, inexpensive in manufacture and trouble-free when in use.

Other objects and a fuller understanding of the invention will be had by referring to the following description and claims of a preferred embodiment thereof, taken in conjunction with the accompanying drawing wherein like reference characters refer to similar parts throughout the several views and in which:

FIG. 1 is a top plan view of a novel swimming plane in operating position in accordance with the instant invention.

FIG. 2 is a cross section taken along line 2—2 of FIG. 1, looking in the direction of the arrows.

FIGS. 3–8 show modified configurations of the swimming plane of FIG. 1.

FIG. 9 is a cross section taken along line 9—9 of FIG. 1, looking in the direction of the arrows.

FIG. 10 is a cross section taken along line 10—10 of FIG. 1, looking in the direction of the arrows.

FIG. 11 is a top plane view of a preferred embodiment of a novel swim fin in accordance with the instant invention.

FIG. 13 is a front elevational view of a novel swimming fin.

FIG. 19 is a top plan view of a modified form of swimming plane.

FIG. 20 is a cross section taken along line 20—20 of FIG. 19.

FIG. 21 is a top plan view of a modified form of swimming plane.

FIG. 22 is a cross section taken along line 22—22 of FIG. 21, looking in the direction of the arrows.

FIG. 23 is a top plan view of the modified swimming plane of FIG. 19 in operating position.

FIG. 24 is a side elevation of view of the swimming plane of FIG. 19 illustrating the upward stroke.

FIG. 25 is a side elevational view of the swimming plane of FIG. 19 illustrating the downward stroke.

FIG. 26 is a schematic representation of the operation of the swimming planes of FIG. 1.

FIG. 27 is a top plan view of a two part swimming plane in accordance with the instant invention.

FIG. 28 is a side elevational view of a two part swimming plane.

FIG. 29 is a side elevational view of a two part swimming plan indicating the position of the swimmer's hand.

Figure 12:
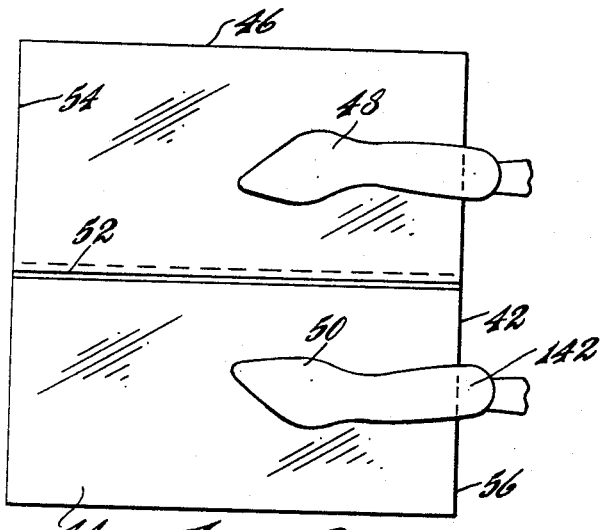
FIG. 12 is a top plan view of a modification of the swim fin of FIG. 11.
Figure 14:
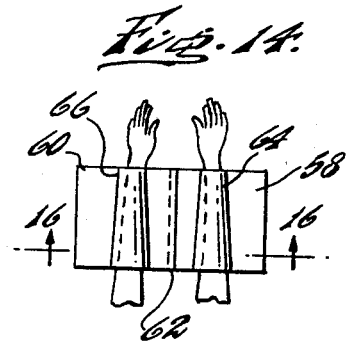
FIG. 14 is a top plan view of a novel swimming plane.
Figure 15:
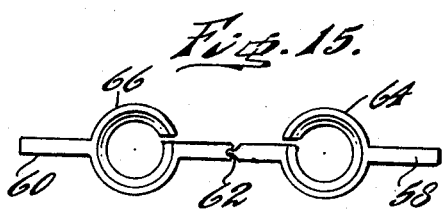
FIG. 15 is a rear elevational view of the plane of FIG. 14.
Figure 17:
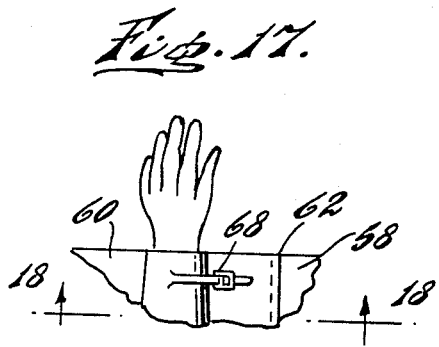
FIG. 17 is a partial top plan view showing a detail of the wrist connection of the swimming plane of FIG. 14.
Figure 16:
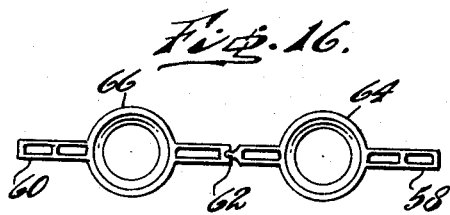
FIG. 16 is a cross section taken along line 16—16 of FIG. 14, looking in the direction of the arrows.
Figure 16A:
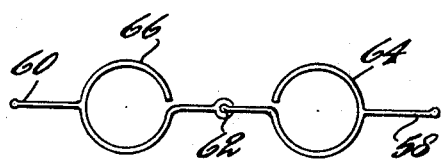
FIG. 16a is a cross section similar to FIG. 16 showing a modified form thereof.
Figure 18:
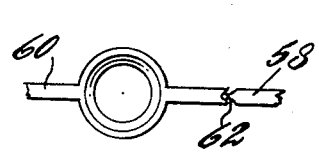
FIG. 18 is a cross section taken along line 18—18 of FIG. 17, looking in the direction of the arrows.

Although specific terms are used in the following description for the sake of clarity these terms are intended to refer only to the particular structure of my invention selected for illustration in the drawings and are not intended to define or limit the scope of the invention.

Referring now to the drawings, I show in FIG. 1 a swimming plane or flipper 10 adapted for use with the arms of the swimmer. The flipper 10 may be constructed of a stiff material covered with a heat sealing vinyl plastic to render it waterproof or the entire board can be constructed of a flexible material such as rubber or suitable plastic. In the embodiment illustrated, the flipper includes a front guide 12 which is pivotally connected to the arm guide 14 by the transverse hinge 16. Similarly, the arm guide 14 pivotally connects to the trailing guide 18 by the transverse hinge 20. Right and left arm sleeves 22, 23 and 24, 25 secure the arms to the arm guide 14 and the trailing guide 18 and are arranged to permit quick and safe arm removal to prevent entrapment of the swimmer in case of emergency.

As best seen in FIGS. 9 and 10, the arm sleeves 22, 23 24 and 25 are secured to the guides and are constructed of strong, flexible material to allow arm insertion without shearing. When desired, the free edge of the sleeve may be formed into a longitudinally rolled extension 26. This construction allows arm insertion into the sleeve by a sideways action and permits quick disengagement upon reversing the sideways movements. A medially positioned hand opening 28 is provided along the transverse hinge 16, to permit manual positioning of the front guide 12 as hereinafter more fully set forth.

FIGS. 3, 4, 5, 6, 7 and 8 all illustrate various configurations of two part swimming planes, each comprising a front guide 30 and an arm guide 32 pivotally joined by the transverse hinge 34 to permit hand operation of the front guide 30 by the swimmer. As shown in FIG. 27, the hands of the swimmer are inserted through the hand opening 36 and grasp the front guide 30 for swimming control purposes. Right and left sleeves 38, 40 extend from the arm guide 32 to secure the arms of the wearer in operating positions.

In FIGS. 11, 12 and 13, I show swimming fins 42 comprising right and left flippers 44, 46 pivotally and separably joined by the longitudinal hinge 52. The flippers may be used singly, but display superior performance characteristics when interlocked and operated in unison. The flippers 44, 46 are each provided with an integrally molded foot pocket 48, 50 and are fabricated to be relatively stiff near the foot pockets and relatively flexible near the trailing edge 54. Rubber or molded plastic may be utilized for this purpose. The distance between the leading edge 56 and the trailing edge may be varied to expose more or less flipper surface to contact the water. As swimmers become stronger and more proficient in the use of the novel flippers, the front to rear distance can be correspondingly increased.

A modified type of arm operated swimming plane is set forth in FIGS. 14, 15, 16A, 17 and 18 wherein adjacent right and left planes 58, 60 are pivotally joined along the longitudinal connecting hinge 62. I prefer to fabricate the planes as vinyl extrusions both from a standpoint of economy in manufacture and function with the arm engaging sleeves 64, 66 integrally formed therewith. When in use, the plane will tend to move backwards due to the resistance of the water. In order to keep the planes from slipping past the elbows of the wearer and thus restricting his activity, wrist securing straps 68 adjustably secured to the planes have been found useful.

A one piece flexible swimming plane 70 is set forth and illustrated in FIGS. 19, 20, 21, 22, and 23 wherein the flexible plans may be fabricated of rubber or vinyl plastic suitably reinforced for the service. In the embodiment illustrated in FIG. 19, a plurality of longitudinally disposed, spaced ribs 72 strengthen the plane 70 and carry the flexible webbing 74 therebetween to provide a unitary construction. A pair of front hand openings 76, 78 are forwardly closed by the reinforced leading edge 80 which must be thin and strong, and preferably constructed of a transverse length of tempered wire 82 completely enclosed in the rubber or vinyl webbing material 84. A securing strap 86 is secured above the trailing edge 88 of the plane 70 and is sized to accommodate both arms of the swimmer to permit maximum flexure and control during the swimming movements. The ribs 72 are fabricated of wire or molded plastic for stiffness in one direction and are preferably covered with the webbing material of rubber or vinyl which may be heat sealed, cemented or molded thereto in any well known manner. If desired, hand pockets may be fabricated in the front of the plane in lieu of the openings 76, 78.

In FIG. 21, I show an alternate method of constructing a one piece swimming plane utilizing a body 90 of flexible plastic sheet or core sheet 92 sealed completely in an enclosing envelope of vinyl plastic 94. The leading edge 96 and trailing edge 98 are sandwiched between metal stiffeners 100, 102 to provide the required rigidity. The one piece swimming planes may be constructed approximately twenty-eight inches wide by eighteen inches deep for swimmers of average ability. However, the dimensions may be increased for stronger swimmers or decreased for novices in accordance with the individual skills of the swimmer.

In order to use the swimming plane of FIGS. 1, 2 the arms 132, 134 of the swimmer 136 are inserted through the sleeves 22, 23 24, 25 until the front edge of the opening 28 can be grasped with the thumbs below the front guide 12 and the other fingers above the guide. In this manner, the front guide 12 may be pivoted upwardly and downwardly about the hinge 16 by wrist action on the part of the swimmer and the arm guide 14 may be downwardly pivoted about the hinge 20 by the swimmer bending his elbows.

As best seen in FIGS. 28, 29 the swimming planes of FIGS. 3, 4, 5, 6, 7, 8 and 27 may be used by inserting the wrists of the swimmer through the sleeves 38, 40 until the front guide 30 is grasped between the fingers and thumb of each hand as best seen in FIG. 27. In this manner, the front guide 30 can readily be flexed upwardly and downwardly as indicated in FIG. 28.

The swimming planes are used to propel the swimmer through the water by grasping the front guide with the hands as above described and swinging it in a rhythmic, paddle-like motion, leading the up-swing and down-swing motion of the arms to cause a hydro-dynamic current action of the water similar to the rolling movements of a porpoise. This action is illustrated in FIG. 26 wherein the front guide 30 and the arm guide 32 are schematically illustrated in sequential positions forming the undulating path 138. When on the upward slope of the path, the front guide 30 is flexed upwardly to lead the swing of the arms in the upward direction. The front guide 30 is then downwardly directed to lead the downward swing of the arms and the attached arm guide 32. In this manner, the swimmer can guide his movements through the water along a course similar to the path 138.

The swimming fins 44, 46 of FIGS. 11, 12 may be utilized in conjunction with the swimming planes by inserting the feet 140, 142 of the swimmer into the pockets 48, 50 in well known manner and connecting the fins along the hinge 52. The fins can then be operated in unison to help propel the body of the swimmer along the path 138 by stroking and coordinating in a manner similar to that presently employed by racing swimmers using the butterfly stroke.

The swimming planes illustrated in FIGS. 19, 21 may be employed by a swimmer 136 in the manner illustrated in FIGS. 24, 25. The leading edge 80 is first grasped by the hands of the swimmer through the openings 76, 78 and the arms 132, 134 are secured to the trailing edge 88 by means of the strap 86. The swimmer may then propel himself forwardly through the water by taking a series of rhythmic strokes. By alternately bending his arms upwardly and downwardly, the swimmer can cause water deflecting forces along the surfaces of the plane 70. The arm curvature of the plane for a natural, rhythmic, waving motion.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:
1. In a one piece swimming aid, the combination of
 (A) a unitary, flexible, generally rectangular sheet having a leading edge and a trailing edge,
  (1) said leading edge being strengthened by transverse reinforcing means,
   (a) said reinforcing means including a thin strong, length of tempered wire embedded within the construction of the said leading edge;
   (b) arm holding means secured above the said trailing edge,
    (1) said arm holding means including a adjustable strap for tightening about the arm of the swimmer;
   (c) hand attaching means located immediately rearwardly of the said leading edge,
    (1) said hand attaching means including portions of the said leading edge
2. The invention of claim 1 and a plurality of longitudinally disposed, spaced, flexible ribs extending from the said leading edge to the said trailing edge, said ribs being flexible in a longitudinal direction only.
3. The invention of claim 1 wherein the said flexible sheet comprises a flexible composite body including a flexible plastic core forwardly and rearwardly reinforced by transverse metal stiffeners, the said core sheet and stiffeners being completely sealed in an enclosing envelope of vinyl plastic material.

References Cited
UNITED STATES PATENTS

| 1,715,571 | 6/1929 | Robertson | 9—307 |
| 1,752,120 | 3/1930 | Taylor | 9—307 |
| 3,048,141 | 8/1962 | Fisk | 115—22.2 |
| 3,165,764 | 1/1965 | Christiansen | 9—309 |

FOREIGN PATENTS 3,622  12/1907  Great Britain.

MILTON BUCHLER, *Primary Examiner.*
J. PITTENGER, *Assistant Examiner.*